United States Patent
Uehara (10) Patent No.: US 11,408,468 B2
(45) Date of Patent: Aug. 9, 2022

(54) TORQUE LIMITER EMBEDDED DAMPER DEVICE

(71) Applicant: EXEDY Corporation, Neyagawa (JP)

(72) Inventor: Hiroshi Uehara, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 365 days.

(21) Appl. No.: 16/793,532

(22) Filed: Feb. 18, 2020

(65) Prior Publication Data

US 2020/0318691 A1    Oct. 8, 2020

(30) Foreign Application Priority Data

Apr. 3, 2019    (JP) .............................. JP2019-071118

(51) Int. Cl.
| | |
|---|---|
| *F16D 7/02* | (2006.01) |
| *B60K 17/02* | (2006.01) |
| *F16D 3/12* | (2006.01) |
| *F16F 15/123* | (2006.01) |
| *F16F 15/129* | (2006.01) |

(52) U.S. Cl.
CPC .............. *F16D 7/025* (2013.01); *B60K 17/02* (2013.01); *F16D 3/12* (2013.01); *F16F 15/123* (2013.01); *F16F 15/1297* (2013.01)

(58) Field of Classification Search
CPC . F16D 7/025; F16D 3/12; B60K 17/02; F16F 15/123; F16F 15/1297
USPC .................................................. 464/46, 68.1
See application file for complete search history.

(56) References Cited

U.S. PATENT DOCUMENTS

| 5,722,895 A | 3/1998 | Graton et al. |
|---|---|---|
| 2011/0028225 A1 | 2/2011 | Jameson et al. |
| 2015/0045124 A1 | 2/2015 | Steinberger et al. |
| 2017/0268575 A1 | 9/2017 | Satyaseelan |

FOREIGN PATENT DOCUMENTS

| GB | 390420 | * 4/1933 | .................... 464/46 |
|---|---|---|---|
| JP | 2011-226572 A | 11/2011 | |

OTHER PUBLICATIONS

Extended European Search Report of the corresponding European Application No. 20163884.8, dated Sep. 3, 2020, 7 pp.

* cited by examiner

*Primary Examiner* — Greg Binda
(74) *Attorney, Agent, or Firm* — United IP Counselors, LLC (57) ABSTRACT

A torque limiter embedded damper device is provided between a power source-side member and an output-side member. The torque limiter embedded damper device includes a damper unit coupled to the output-side member, and a torque limiter unit that limits torque transmitted between the power source-side member and the damper unit. The damper unit includes first and second plates opposed to each other. The first and second plates have a disc shape. The first plate includes a first coupling portion in an outer peripheral end thereof. The second plate includes a second coupling portion in an outer peripheral end thereof. The first and second coupling portions are coupled to each other. The torque limiter unit includes a friction disc including a third coupling portion in an inner peripheral part thereof. The third coupling portion is coupled to the damper unit and disposed radially inside the first and second coupling portions.

8 Claims, 6 Drawing Sheets

TORQUE LIMITER EMBEDDED DAMPER DEVICE

CROSS-REFERENCE TO RELATED APPLICATIONS

This application claims priority to Japanese Patent Application No. 2019-071118, filed on Apr. 3, 2019. The contents of that application are incorporated by reference herein in their entirety.

TECHNICAL FIELD

The present invention relates to a damper device, particularly to a torque limiter embedded damper device provided between a power source-side member and an output-side member.

BACKGROUND ART

A type of hybrid vehicle including an engine and an electric motor, for instance, uses such a damper device having a torque limiter function as described in Japan Laid-open Patent Application Publication No. 2011-226572 in order to prevent transmission of an excessive torque from an output side to an engine side in engine start and so forth.

The damper device described in Japan Laid-open Patent Application Publication No. 2011-226572 is provided with a damper part, including a pair of plates and a plurality of torsion springs, and a torque limiter disposed on an outer peripheral side of the damper part. The damper part and the torque limiter are coupled by rivets. Additionally, a plate composing part of the torque limiter is fixed to a flywheel by bolts.

Here, a torque, transmitted between the damper part and the flywheel, is limited by the torque limiter, whereby transmission of an excessive torque is prevented between the both.

In the damper device described in Japan Laid-open Patent Application Publication No. 2011-226572, the torque limiter is disposed on the outer peripheral side of the damper part. In more detail, the damper part includes a pair of side plates each having a disc shape as an input-side rotor, whereas the torque limiter includes a friction disc provided with friction members fixed to the both lateral surfaces thereof. Moreover, an inner peripheral part of the friction disc is fixed to an outer peripheral part of one of the pair of side plates by rivets.

Increase in radial dimension is inevitable in such a well-known torque limiter embedded damper device as described above, and this hinders compactness in size of the device.

BRIEF SUMMARY

It is an object of the present invention to realize compactness in size of a damper device having a torque limiter function by inhibiting increase in radial dimension of the damper device.

(1) A torque limiter embedded damper device according to the present invention is provided between a power source-side member and an output-side member. The present torque limiter embedded damper device includes a damper unit and a torque limiter unit. The damper unit is coupled to the output-side member. The torque limiter unit limits a torque transmitted between the power source-side member and the damper unit. The damper unit includes a first plate and a second plate. The first and second plates, each having a disc shape, are disposed in opposition to each other. The first plate includes a first coupling portion in an outer peripheral end thereof, while the second plate includes a second coupling portion in an outer peripheral end thereof. The first and second coupling portions are coupled to each other. The torque limiter unit includes a friction disc that includes a third coupling portion in an inner peripheral part thereof. The third coupling portion is coupled to the damper unit while disposed radially inside the first and second coupling portions.

In the present torque limiter embedded damper device, a torque, transmitted between the power source-side member and the damper unit, is limited by the torque limiter unit. Therefore, when the present torque limiter embedded damper device is installed in a hybrid vehicle, for instance, an excessive torque can be prevented from being transmitted from the output side to the engine side in engine start or so forth.

The torque limiter unit is herein coupled to the damper unit in a position located radially inside the first and second coupling portions at which the first and second plates of the damper unit are coupled to each other. In other words, the torque limiter unit is coupled to the damper unit in a radially inner position than that in a well-known torque limiter embedded damper device. Therefore, increase in radial dimension of the present torque limiter embedded damper device can be more inhibited than that of the well-known torque limiter embedded damper device.

(2) Preferably, the first plate includes a body having a disc shape, an axial extending portion and a radial extending portion. The axial extending portion extends from an outer peripheral part of the body toward the second plate. The radial extending portion extends radially outward from a distal end of the axial extending portion. Besides, the first coupling portion is the radial extending portion.

Here, the body, the axial extending portion and the radial extending portion of the first plate can be easily processed when integrally processed by stamping.

(3) Preferably, the friction disc includes an annular portion provided with a friction material. Besides, preferably, the third coupling portion is provided to protrude radially inward from an inner peripheral end of the annular portion and is coupled to the first plate.

(4) Preferably, the first plate includes a plurality of first window portions disposed in circumferential alignment, while the second plate includes a plurality of second window portions disposed in circumferential alignment. Besides, preferably, the damper unit further includes a plurality of elastic members held by the first window portions and the second window portions. Furthermore, the third coupling portion is disposed circumferentially between adjacent two of the plurality of first window portions.

(5) Preferably, the third coupling portion overlaps in part with the plurality of first window portions in terms of radial positions.

(6) Preferably, the torque limiter unit includes first and second sandwiching plates and an urging member. The first and second sandwiching plates are disposed to sandwich the friction disc therebetween and are fixed to each other so as to be axially immovable. The urging member is disposed to be sandwiched together with the friction disc between the first and second sandwiching plates and urges the friction disc.

(7) Preferably, the torque limiter unit is capable of being made self-contained while the friction disc and the urging member are sandwiched between the first and second sandwiching plates. Besides, the torque limiter unit is coupled to the damper unit through the third coupling portion of the friction disc while made self-contained.

Here, the torque limiter unit is complete in itself and is thus capable of being made self-contained. In other words, the torque limiter unit can be assembled separately from the damper unit and can be obtained as a subassembly. Therefore, in assembling the entirety of the torque limiter embedded damper device, the torque limiter unit, obtained as the subassembly in advance, can be coupled to the damper unit, whereby assembling work is made easy.

Moreover, in attempt to change a torque transmission capacity, the present torque limiter embedded damper device is only required to change the torque limiter unit, because the torque limiter unit can be obtained as the subassembly. In other words, the present torque limiter embedded damper device can easily cope with a variety of specifications.

(8) Preferably, the second plate includes an assembling hole for attaching the damper unit to the power source-side member in a corresponding position to the third coupling portion of the friction disc.

Now, when the torque limiter unit is not necessary for the damper device, chances are that the friction disc (i.e., the torque limiter unit) is detached from the first plate, and only the damper unit is attached to the power source-side member. In this case, only the damper unit can be attached to the power source-side member with a bolt or so forth by utilizing a hole that is provided in the first plate so as to couple the first plate to the friction disc. Moreover, the bolt or so forth, when attached to the power source-side member, can be fastened by utilizing the assembling hole of the second plate. Hence, this work can be made easy.

According to the present invention described above, it is possible to achieve compactness in size of a damper device having a torque limiter function by inhibiting increase in radial dimension of the damper device.

DETAILED DESCRIPTION

[Entire Configuration]

Figure 1:
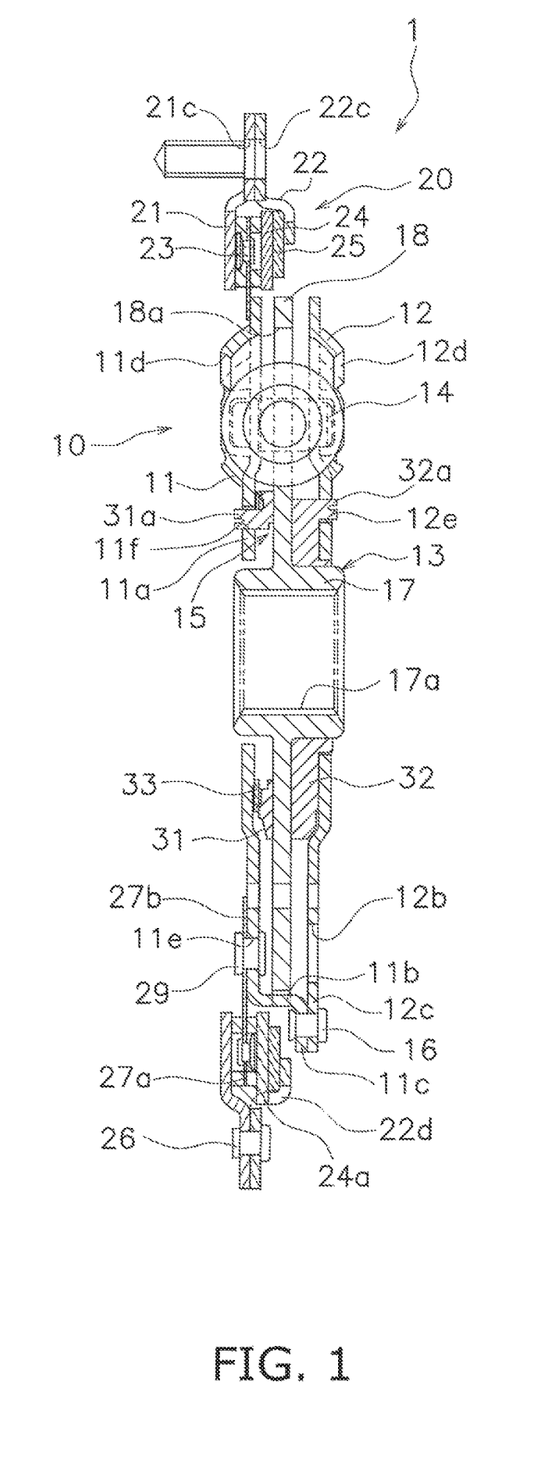
FIG. 1 is a cross-sectional view of a damper device according to a preferred embodiment of the present invention.
Figure 2:
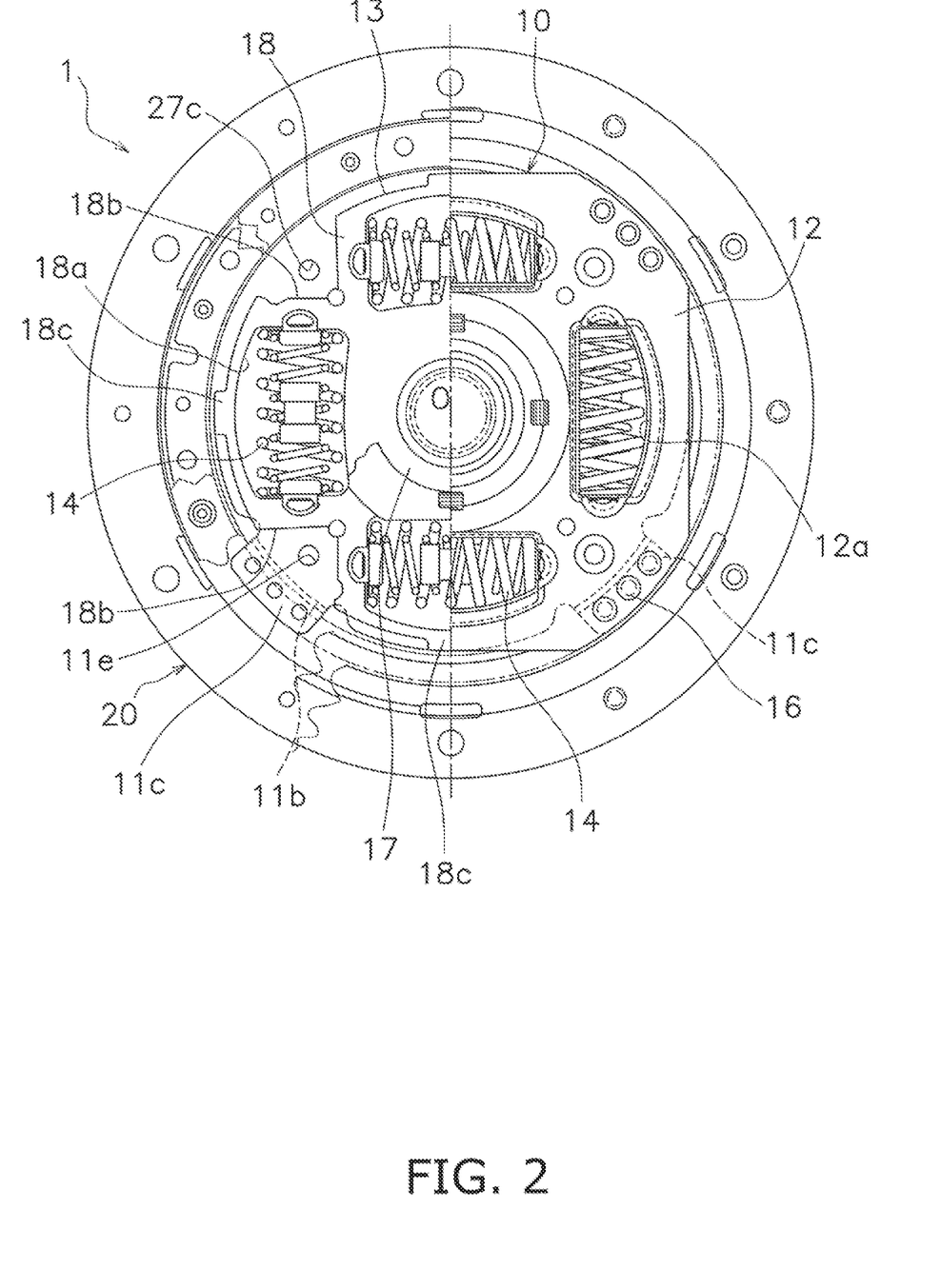
FIG. 2 is a front view of the damper device shown in FIG. 1.

FIG. 1 is a cross-sectional view of a torque limiter embedded damper device 1 (hereinafter simply referred to as "damper device 1" on an as-needed basis) according to a preferred embodiment of the present invention. Additionally, FIG. 2 is a front view of the damper device 1, from part of which some constituent members are detached. In FIG. 1, an engine is disposed on the left side of the damper device 1, whereas a drive unit, including an electric motor, a transmission and so forth, is disposed on the right side of the damper device 1.

The damper device 1 is a device provided between a flywheel and an input shaft of the drive unit in order to limit a torque transmitted between the engine and the drive unit and attenuate rotational fluctuations. The damper device 1 includes a damper unit 10 and a torque limiter unit 20.

[Damper Unit 10]

As shown in FIG. 1, the damper unit 10 includes first and second plates 11 and 12, a hub flange 13, a plurality of torsion springs 14 (exemplary elastic members) and a hysteresis generating mechanism 15.

<First Plate 11>

The first plate 11 is a member to which a constituent member of the torque limiter unit 20 is coupled. The first plate 11 includes a body 11a having a disc shape, a plurality of stopper portions 11b (exemplary axially extended portions) and first coupling portions 11c. The body 11a is provided with a plurality of first window portions 11d in the outer peripheral part thereof. The first window portions 11d are disposed in circumferential alignment. Each first window portion 11d includes a hole and holding portions. The hole axially penetrates the first plate 11. The holding portions are provided on the inner and outer peripheral edges of the hole. The stopper portions 11b are formed by bending the outer peripheral end of the first plate 11 toward the second plate 12. The first coupling portions 11c are composed of the distal ends of the stopper portions 11b, which are further bent radially outward. Additionally, the first plate 11 is provided with a plurality of rivet holes 11e in the outer peripheral part thereof in order to attach thereto the torque limiter unit 20.

<Second Plate 12>

The second plate 12 is disposed in axial opposition to the first plate 11 at an interval. The second plate 12 is made approximately in the shape of a disc including a straight portion in part of the outer peripheral surface thereof. Besides, the outermost diameter of the second plate 12 is equal to the outer diameter of the first plate 11. The second plate 12 is provided with a plurality of second window portions 12d in the outer peripheral part thereof. The second window portions 12d are provided in opposed positions to the first window portions 11d of the first plate 11. Each second window portion 12d includes a hole and holding portions. The hole axially penetrates the second plate 12. The holding portions are provided on the outer and inner peripheral edges of the hole. The second plate 12 is provided with second coupling portions 12c composed of outer peripheral parts of regions circumferentially interposed between adjacent second window portions 12d. Additionally, the first coupling portions 11c of the first plate 11 and the second coupling portions 12c of the second plate 12 are fixed by rivets 16. Accordingly, the first plate 11 and the second plate 12 are immovable from each other in both axial and rotational directions.

Moreover, the second plate 12 is provided with a plurality of assembling work holes 12b in the outer peripheral part thereof. The assembling work holes 12b are disposed in corresponding positions to the rivet holes 11e of the first plate 11.

<Hub Flange 13>

The hub flange 13 includes a hub 17 and a flange 18. The hub 17, having a tubular shape, is provided in the center part of the hub flange 13. The flange 18 extends radially outward from the outer peripheral surface of the hub 17. The hub 17 is provided with a spline hole 17a on the inner peripheral surface thereof, whereby the input shaft of the drive unit is capable of being spline-coupled to the spline hole 17a. The flange 18, having a disc shape, is disposed axially between the first plate 11 and the second plate 12. The flange 18 is provided with a plurality of accommodation portions 18a. Each accommodation portion 18a is provided in a corresponding position to a pair of the first window portion 11d of the first plate 11 and the second window portion 12d of the second plate 12. Additionally, the flange 18 is provided with a plurality of cutouts 18b on the outer peripheral end thereof. Each cutout 18b has a V-shape and is opened radially outward.

The flange 18 is provided with a plurality of protrusions 18c on the outer peripheral surface thereof. The protrusions 18c protrude radially outward. The stopper portions 11b of the first plate 11 are capable of making contact with one-side circumferential end surfaces of the protrusions 18c, respectively. In other words, the stopper portions 11b of the first plate 11 and the protrusions 18c of the flange 18 compose a stopper mechanism that restricts a torsion angle between the first and second plates 11 and 12 and the hub flange 13 to fall within a predetermined angular range.

<Torsion Springs 14>

The plural torsion springs 14 are accommodated in the accommodation portions 18a of the hub flange 13, respectively, while being held in both axial and radial directions by the pairs of the first window portion 11d of the first plate 11 and the second window portion 12d of the second plate 12, respectively. Additionally, the both circumferential end surfaces of each torsion spring 14 are capable of making contact with those of each pair of window portions 11d and 12d and those of each accommodation portion 18a.

<Hysteresis Generating Mechanism 15>

The hysteresis generating mechanism 15 includes a first friction plate 31, a second friction plate 32 and a cone spring 33.

The first friction plate 31 is disposed axially between the inner peripheral part of the first plate 11 and that of the flange 18 of the hub flange 13. The first friction plate 31 is provided with a plurality of engaging protrusions 31a axially protruding. The engaging protrusions 31a are engaged with holes 11f provided in the first plate 11. Therefore, the first friction plate 31 is non-rotatable relative to the first plate 11.

The second friction plate 32 is disposed axially between the inner peripheral part of the second plate 12 and that of the flange 18 of the hub flange 13. The second friction plate 32 is provided with a plurality of engaging protrusions 32a axially protruding. The engaging protrusions 32a are engaged with holes 12e provided in the second plate 12. Therefore, the second friction plate 32 is non-rotatable relative to the second plate 12.

The cone spring 33 is disposed axially between the first plate 11 and the first friction plate 31. The cone spring 33 presses the first friction plate 31 onto the flange 18, and simultaneously, presses the second friction plate 32 onto the flange 18 through the first plate 11 and the second plate 12 fixed to the first plate 11.

In the hysteresis generating mechanism 15 described above, when the first and second plates 11 and 12 and the hub flange 13 are rotated relative to each other, friction resistance (hysteresis torque) is generated between the first friction plate 31 and the flange 18, while friction resistance is generated between the second friction plate 32 and the flange 18.

[Torque Limiter Unit 20]

Figure 3:
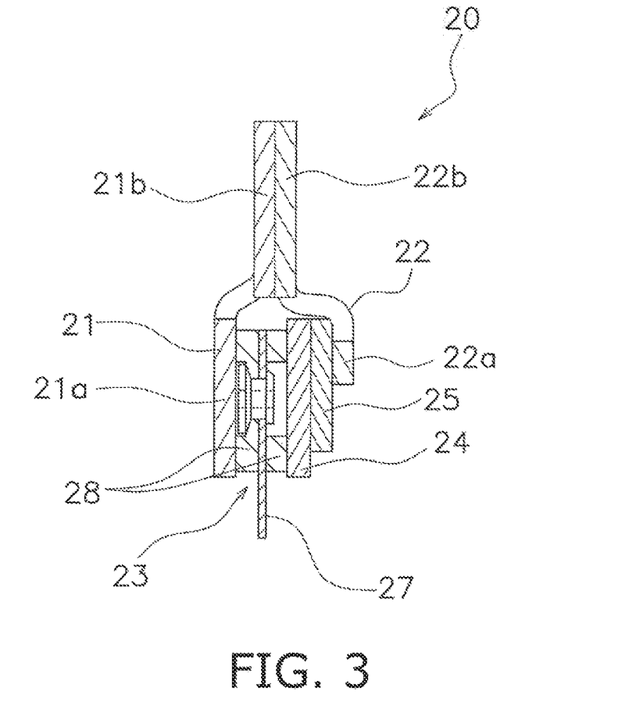
FIG. 3 is a view of a torque limiter unit extracted from the damper device shown in FIG. 1.

The torque limiter unit 20 is disposed on the outer peripheral side of the damper unit 10. The torque limiter unit 20 limits a torque transmitted between the flywheel and the damper unit 10. As shown in FIG. 3, the torque limiter unit 20 includes first and second sandwiching plates 21 and 22, a friction disc 23, a pressure plate 24 and a cone spring 25. It should be noted that FIG. 3 shows the torque limiter unit 20-related components extracted from FIG. 1.

<First and Second Sandwiching Plates 21 and 22>

The first sandwiching plate 21 includes a friction portion 21a having an annular shape and a fixation portion 21b. The fixation portion 21b is formed by axially offsetting (displacing) the outer peripheral part of the friction portion 21a toward the second sandwiching plate 22. The second sandwiching plate 22 includes a support portion 22a having an annular shape and a fixation portion 22b. The inner diameter of the support portion 22a is larger than that of the friction portion 21a of the first sandwiching plate 21. In other words, the radial width of the support portion 22a is narrower than that of the friction portion 21a of the first sandwiching plate 21. The fixation portion 22b of the second sandwiching plate 22 is formed by axially offsetting (displacing) the outer peripheral part of the support portion 22a toward the first sandwiching plate 21. Additionally, the fixation portion 21b of the first sandwiching plate 21 and the fixation portion 22b of the second sandwiching plate 22 are fixed to each other by a plurality of rivets 26 (see FIG. 1).

It should be noted that in order to fix the torque limiter unit 20 to the flywheel, the fixation portion 21b of the first sandwiching plate 21 is provided with a plurality of holes 21c (see FIG. 1), while the fixation portion 22b of the second sandwiching plate 22 is provided with a plurality of holes 22c (see FIG. 1).

<Friction Disc 23>

Figure 4:
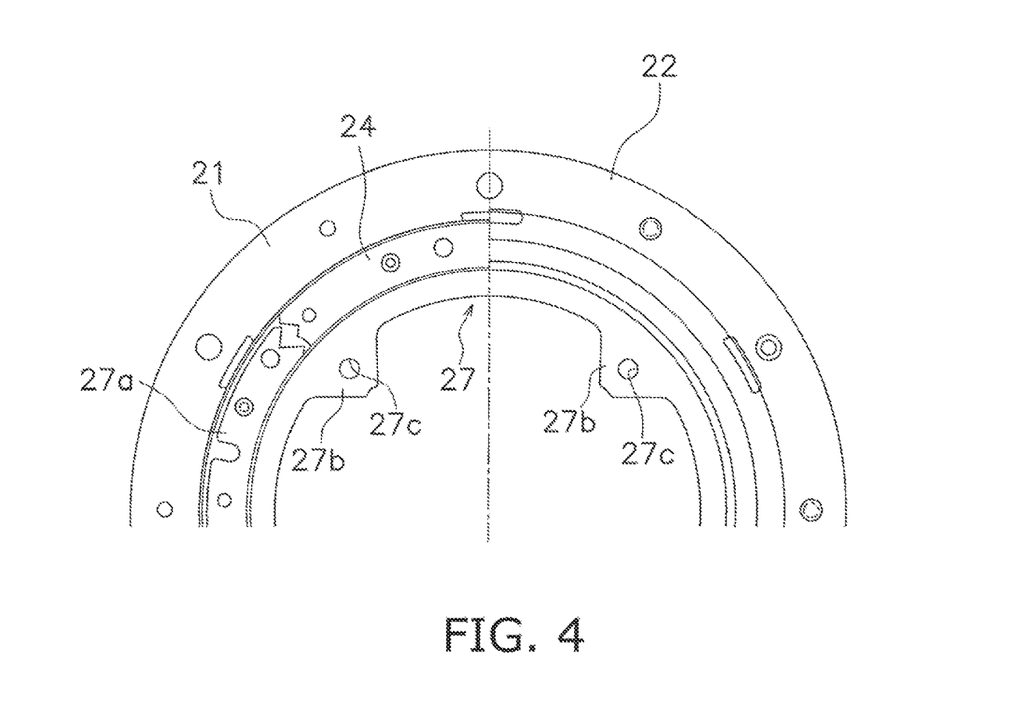
FIG. 4 is a partial front view of the torque limiter unit.

As shown in FIG. 3, the friction disc 23 includes a core plate 27 and a pair of friction members 28 fixed to the both lateral surfaces of the core plate 27 by rivets. As shown in FIGS. 3 and 4, the core plate 27 includes a body 27a having an approximately annular shape (exemplary annular portion) and a plurality of third coupling portions 27b. FIG. 4 is a front view of part of the torque limiter unit 20. The third coupling portions 27b protrude radially inward from the inner peripheral end of the body 27a and are provided at equal angular intervals in the circumferential direction. Each third coupling portion 27b is provided with a coupling hole 27c. The core plate 27 is fixed to the outer peripheral part of the first plate 11 by rivets 29 (see FIG. 1) that penetrate the coupling holes 27c and the rivet holes 11e of the first plate 11. The flywheel-side one of the pair of friction members 28 makes contact with the friction portion 21a of the first sandwiching plate 21.

<Pressure Plate 24 and Cone Spring 25>

The pressure plate 24 and the cone spring 25 are disposed between the friction disc 23 and the support portion 22a of the second sandwiching plate 22.

The pressure plate 24, having an annular shape, interposes the friction members 28 of the friction disc 23 together with the friction portion 21a of the first sandwiching plate 21 therebetween. As shown in FIG. 1, the pressure plate 24 is provided with a plurality of pawls 24a in the outer peripheral part thereof, and the pawls 24a are engaged with a plurality of engaging holes 22d provided in the second sandwiching plate 22.

The cone spring 25 is disposed between the pressure plate 24 and the support portion 22a of the second sandwiching plate 22. The cone spring 25 presses the friction disc 23 onto the friction portion 21a of the first sandwiching plate 21 through the pressure plate 24.

<Positional Relation Between Damper Unit 10 and Torque Limiter Unit 20>

The third coupling portions 27b of the friction disc 23 are located radially inside the first and second coupling portions 11c and 12c of the first and second plates 11 and 12. Additionally, as seen in a front view, each third coupling portion 27b is disposed circumferentially between adjacent two of the first window portions 11d. Furthermore, the third coupling portions 27b overlap in part with the first window portions 11d in terms of radial positions. Moreover, the inner diameter of the torque limiter unit 20 (the inner diameter of the first sandwiching plate 21) is smaller than the outer diameter of the first and second plates 11 and 12 of the damper unit 10. In other words, the damper unit 10 and the torque limiter unit 20 radially overlap as seen in a direction arranged along the rotational axis.

[Action]

Power, transmitted from the engine to the flywheel, is inputted to the damper unit 10 through the torque limiter unit 20. In the damper unit 10, the power is inputted to the first and second plates 11 and 12 to which the friction disc 23 of the torque limiter unit 20 is fixed, and is then transmitted to the hub flange 13 through the torsion springs 14. Subsequently, the power is further transmitted from the hub flange 13 to the electric motor, the transmission, a power generator and so forth disposed on the output side.

Incidentally, in starting the engine, for instance, chances are that an excessive torque is transmitted from the output side to the engine because the output side has a large inertia amount. In such a case, when transmitted to the engine side, the torque is limited in magnitude to a predetermined value or less by the torque limiter unit 20.

In the damper unit 10, when the power is transmitted to the torsion springs 14 from the first and second plates 11 and 12, the torsion springs 14 are compressed. Besides, the torsion springs 14 are repeatedly compressed and extended by torque fluctuations. When the torsion springs 14 are compressed and extended, torsion (displacement) is produced between the first and second plates 11 and 12 and the hub flange 13. The hysteresis generating mechanism 15 is actuated by this torsion and generates a hysteresis torque. Accordingly, torque fluctuations are attenuated.

[Assemblage]

In the torque limiter unit 20, the friction disc 23, the pressure plate 24 and the cone spring 25 are sandwiched between the first and second sandwiching plates 21 and 22, whereby these members can be integrated as a sub-unit. In other words, the torque limiter unit 20 is complete in itself and is thus capable of being made self-contained in an assemblage step before attaching the torque limiter unit 20 to the damper unit 10. Likewise, the damper unit 10 can be also assembled in advance in another assemblage step.

When the torque limiter unit 20 is then attached to the damper unit 10, rivet swaging is performed by utilizing the assembling work holes 12b of the second plate 12, while the coupling holes 27c of the third coupling portions 27b in the friction disc 23 and the rivet holes 11e of the first plate 11 are aligned in position. Accordingly, the both units 10 and 20 can be fixed to each other.

Here, axis alignment (radial positioning) of the torque limiter unit 20 can be performed with respect to the damper unit 10 by the rivets 29 for fixing the both units 10 and 20 and the holes 27c and 11e penetrated by the rivets 29.

Other Preferred Embodiments

The present invention is not limited to the preferred embodiment described above, and a variety of changes or modifications can be made without departing from the scope of the present invention.

Figure 5:
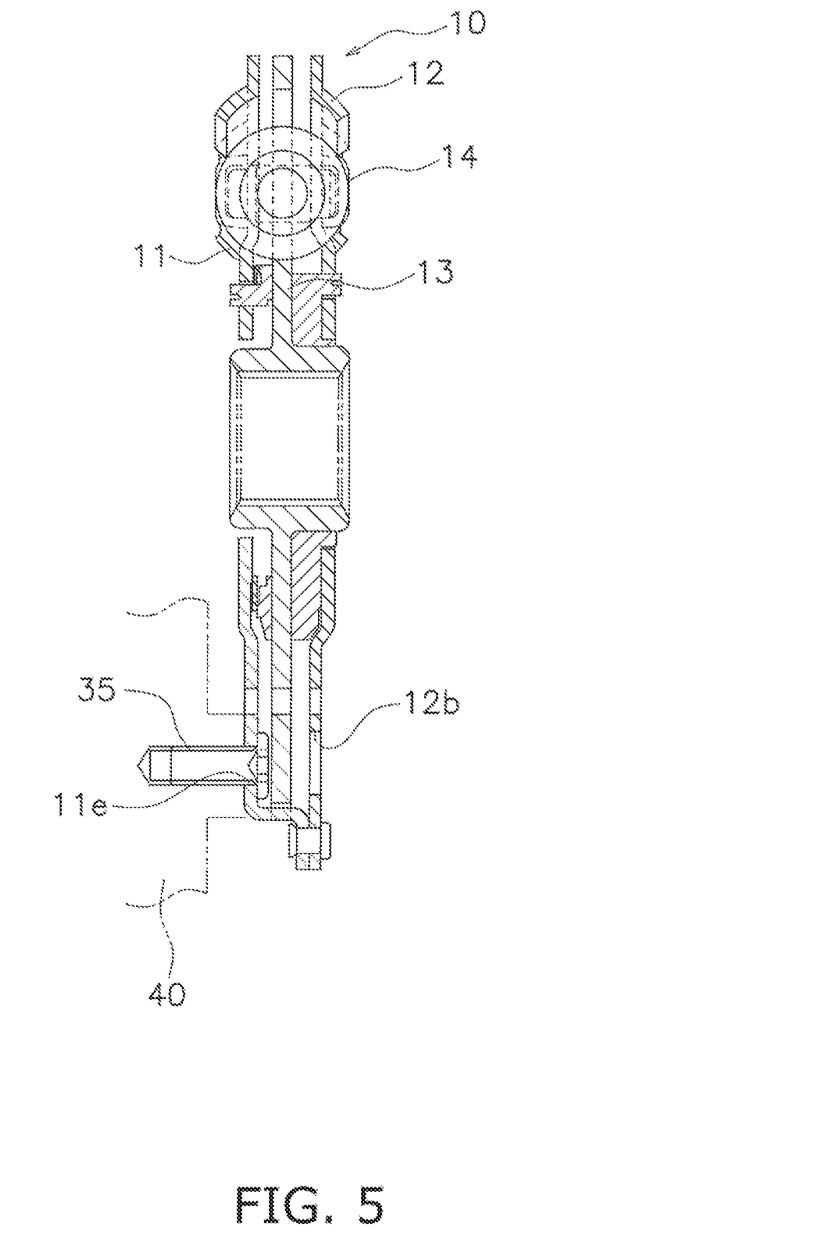
FIG. 5 is a view of the damper device in another use embodiment.

(a) When the torque limiter unit 20 is not necessary, as shown in FIG. 5, bolts 35 are attached to the rivet holes 11e of the first plate 11 before assembling the damper unit 10. Then, the bolts 35 are fastened with a tool by utilizing the assembling work holes 12b of the second plate 12, whereby the damper unit 10 can be attached to a flywheel 40.

Figure 6:
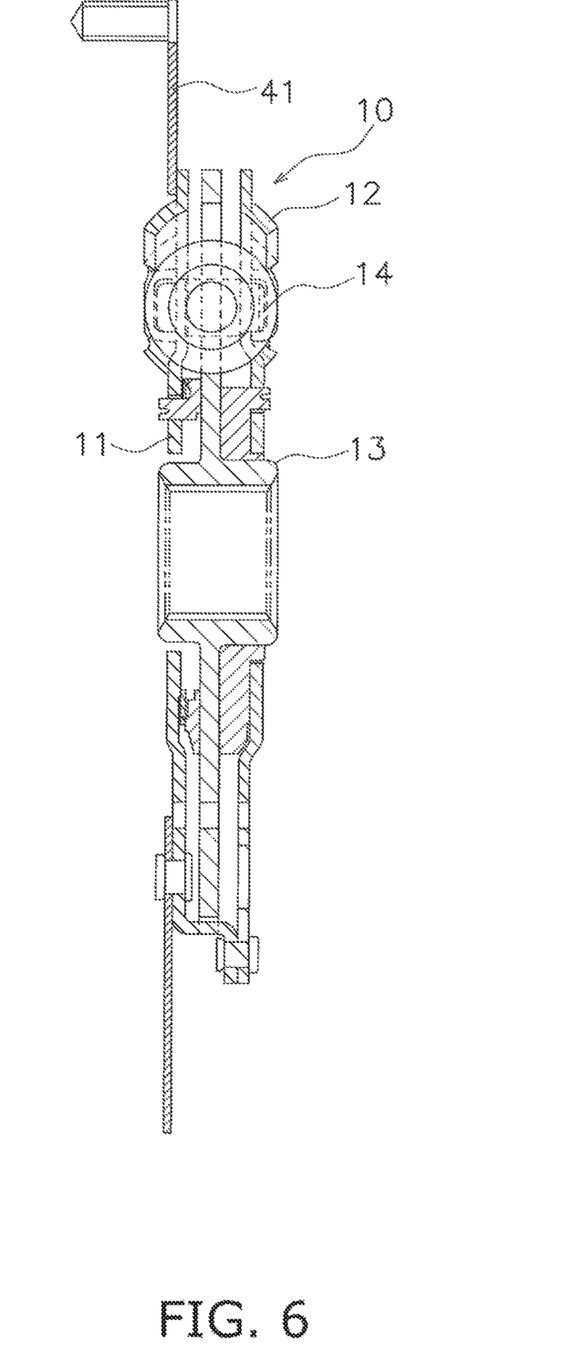
FIG. 6 is a view of the damper device in yet another use embodiment.

Alternatively, as shown in FIG. 6, the damper unit 10 can be also attached to the flywheel through a drive plate 41 instead of the friction disc 23. The configuration of the damper unit 10 is herein similar to that in the aforementioned preferred embodiment.

Figure 7:
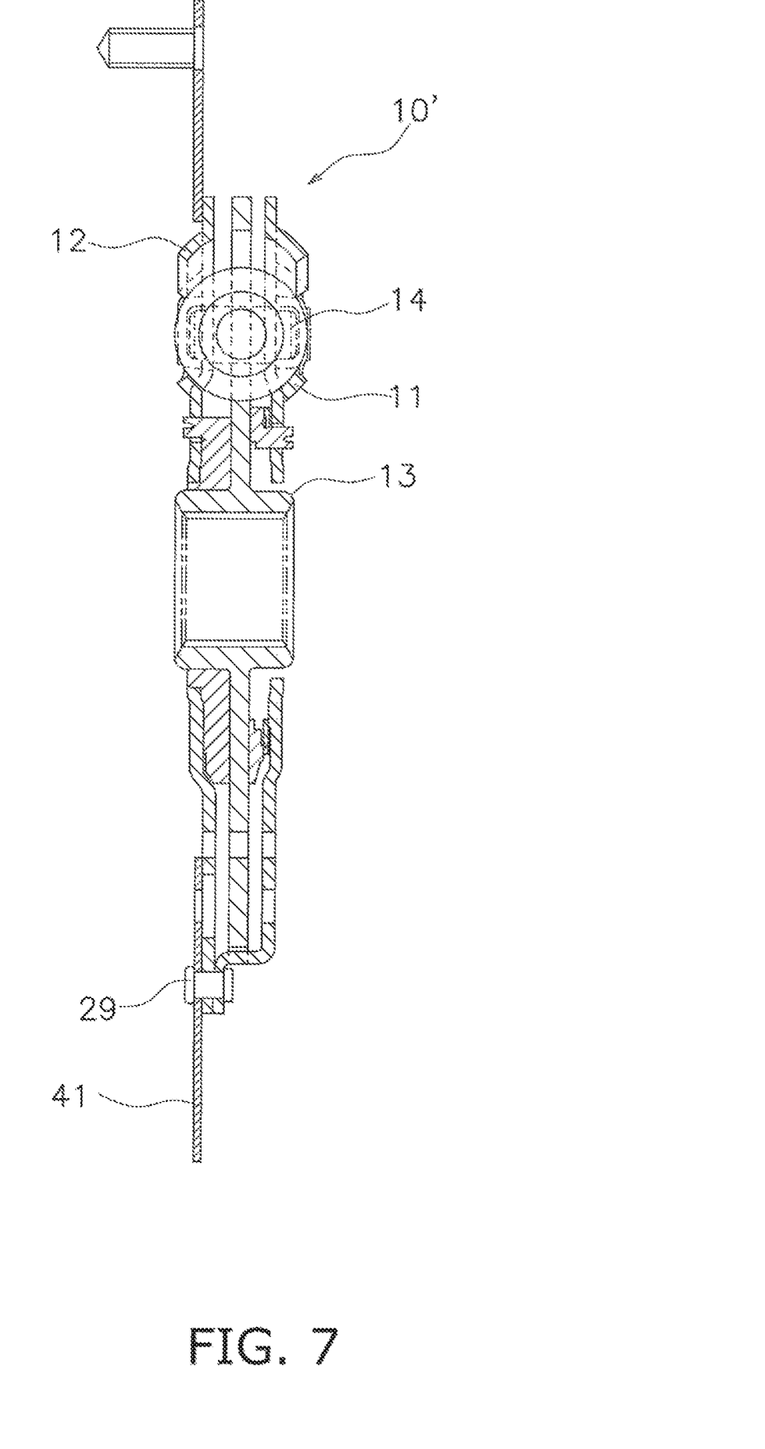
FIG. 7 is a view of the damper device in further yet another use embodiment.

Yet alternatively, when a space for attaching the damper unit is small, as shown in FIG. 7, the drive plate 41 can be also fixed to the first and second plates 11 and 12 by the rivets 29, while the first plate 11 and the second plate 12 are reversed in position.

(b) The specific configuration of the damper unit 10 and that of the torque limiter unit 20 are not limited to those in the aforementioned preferred embodiment.

REFERENCE SIGNS LIST

1 Damper device
10 Damper unit
11 First plate
11c First coupling portion
12 Second plate
12b Assembling work hole
12c Second coupling portion
13 Hub flange
14 Torsion spring
21 First sandwiching plate
22 Second sandwiching plate
23 Friction disc
24 Pressure plate
25 Cone spring
27a Body (annular portion)
27b Third coupling portion

What is claimed is:

1. A torque limiter embedded damper device provided between a power source-side member and an output-side member, the torque limiter embedded damper device comprising:
   a damper unit coupled to the output-side member; and
   a torque limiter unit configured to limit a torque transmitted between the power source-side member and the damper unit, wherein
   the damper unit includes a first plate and a second plate, the first and second plates opposed to each other, the first and second plates each having a disc shape, the first plate including a first coupling portion in an outer peripheral portion thereof, the second plate including a second coupling portion in an outer peripheral portion thereof, the first and second coupling portions coupled to each other,
   the torque limiter unit includes a friction disc, the friction disc including a third coupling portion in an inner peripheral part thereof, the third coupling portion coupled to the damper unit and disposed radially inside the first and second coupling portions, and
   a radially outer end of the friction disc is disposed radially outside a radially outermost end of the first plate.

2. The torque limiter embedded damper device according to claim 1, wherein
   the first plate includes
   a body having a disc shape, an axial extending portion extending from an outer peripheral part of the body toward the second plate, and a radial extending portion extending radially outward from a distal end of the axial extending portion, and the first coupling portion is the radial extending portion.

3. The torque limiter embedded damper device according to claim 1, wherein the friction disc includes an annular portion, the annular portion provided with a friction material, and the third coupling portion protrudes radially inward from an inner peripheral end of the annular portion, the third coupling portion coupled to the first plate.

4. The torque limiter embedded damper device according to claim 3, wherein the first plate includes a plurality of first window portions disposed in circumferential alignment and the second plate includes a plurality of second window portions disposed in circumferential alignment, the damper unit further includes a plurality of elastic members, the plurality of elastic members held by the first window portions and the second window portions, and the third coupling portion is disposed circumferentially between adjacent two of the plurality of first window portions.

5. The torque limiter embedded damper device according to claim 4, wherein the third coupling portion radially overlaps in part with the plurality of first window portions.

6. The torque limiter embedded damper device according to claim 1, wherein the torque limiter unit includes first and second sandwiching plates disposed to sandwich the friction disc therebetween, the first and second sandwiching plates fixed to each other so as to be axially immovable, and an urging member disposed to be sandwiched together with the friction disc between the first and second sandwiching plates, the urging member configured to urge the friction disc.

7. The torque limiter embedded damper device according to claim 6, wherein the torque limiter unit is configured to be self-contained in a state where the friction disc and the urging member are sandwiched between the first and second sandwiching plates, and the torque limiter unit is coupled to the damper unit through the third coupling portion of the friction disc in a state of being self-contained.

8. The torque limiter embedded damper device according to claim 1, wherein the second plate includes an assembling hole for attaching the damper unit to the power source-side member in a corresponding position to the third coupling portion of the friction disc.

\* \* \* \* \*